(12) United States Patent
Mestres et al.

(10) Patent No.: US 8,875,996 B2
(45) Date of Patent: Nov. 4, 2014

(54) BIOMETRICALLY ACTIVATED RADIO FREQUENCY IDENTIFICATION TAG

(75) Inventors: Jean-Christophe Mestres, Vence (FR); Pierre Secondo, Tourrettes sur Loup (FR); Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 11/535,161

(22) Filed: Sep. 26, 2006

(65) Prior Publication Data

US 2007/0069010 A1    Mar. 29, 2007

(30) Foreign Application Priority Data

Sep. 27, 2005  (EP) ...................................... 05300775

(51) Int. Cl.
*G06K 5/00*       (2006.01)
*G06K 19/073*     (2006.01)

(52) U.S. Cl.
CPC ............................... *G06K 19/07354* (2013.01)
USPC ........................................................ 235/380

(58) Field of Classification Search
USPC ........................................................ 235/380
See application file for complete search history.

(56) References Cited

U.S. PATENT DOCUMENTS

| | | | | |
|---|---|---|---|---|
| 4,582,985 A * | 4/1986 | Lofberg | ......................... | 235/380 |
| 6,325,285 B1 * | 12/2001 | Baratelli | ......................... | 235/380 |
| 6,672,512 B2 * | 1/2004 | Bridgelall | ................ | 235/462.46 |
| 7,961,913 B2 * | 6/2011 | Andersson | .................... | 382/115 |
| 2003/0226041 A1 * | 12/2003 | Palmer et al. | .................. | 713/202 |
| 2006/0113381 A1 * | 6/2006 | Hochstein et al. | ............. | 235/382 |
| 2007/0073619 A1 * | 3/2007 | Smith | ............................. | 705/41 |

FOREIGN PATENT DOCUMENTS

| | | |
|---|---|---|
| EP | 1505538 A2 | 2/2005 |
| FR | 2833735 A1 | 6/2003 |

OTHER PUBLICATIONS

PCT Application No. WO/EP2006065809, International Search Report dated Apr. 1, 2008.
PCT Application No. WO/EP2006065809, Written Opinion.

* cited by examiner

*Primary Examiner* — Rafferty Kelly
(74) *Attorney, Agent, or Firm* — Andrea Bauer; Hoffman Warnick LLC

(57) ABSTRACT

A biometrically activated radio frequency identification (RFID) tag including a fingerprint detection matrix, an antenna control circuit, and a biometric identification chip. The fingerprint detection matrix acquires biometric data indicative of a user's identity and passes it to the biometric identification chip. The biometric identification chip compares the biometric data acquired by the fingerprint detection matrix to biometric data stored thereupon. The antenna control circuit activates the RFID tag selectively dependent upon the result of the comparison of the acquired and stored biometric data.

10 Claims, 5 Drawing Sheets

BIOMETRICALLY ACTIVATED RADIO FREQUENCY IDENTIFICATION TAG

FIELD OF THE INVENTION

The present invention relates to a system and method for biometrically activated radio frequency identification (RFID). More particularly, but not exclusively, the invention relates to a biometrically activated RFID tag.

BACKGROUND OF THE INVENTION

An RFID tag can be used in security access cards, employee ID cards, automatic toll-paying devices and ski-lift tickets.

RFID enables storage and remote retrieval of data using a device called a RFID tag or transponder. Such a RFID tag has an antenna to enable it to receive and respond to radio frequency queries from a RFID interrogator.

The RFID tag contains a transponder with a digital memory chip that stores a unique code and also possibly other data. The RFID interrogator emits an activation signal that activates the RFID tag in order that the RFID interrogator can read and/or write data to the RFID tag. When an RFID tag passes into a sensing zone of the RFID interrogator, the RFID tag detects the reader's activation signal. The RFID interrogator decodes data from the RFID tag's integrated circuit.

A RFID tag transmits a response signal to a RFID interrogator when it receives a predetermined interrogation signal from the interrogator. This interrogation signal is a specific command at a predefined frequency having a defined data protocol and encoding scheme. When an RFID tag is interrogated, the response signal transmitted by the RFID tag is used by an application driving the RFID interrogator to authorise an action.

However, there is no verification that the bearer of the RFID tag is the person authorised to use the RFID tag. The identity of the bearer cannot be proven by mere possession of the RFID tag. For example, the RFID tag may have been stolen or lost and in the possession of a person other than the person authorised to use the RFID tag.

SUMMARY OF THE INVENTION

In accordance with a first aspect of the present invention there is provided a method of activating a radio frequency identification (RFID) tag, comprising: acquiring biometric data indicative of an identity of a user at the RFID tag; comparing the acquired biometric data with biometric data of an authorised user; and activating the RFID tag selectively, dependent upon results of the comparison of the acquired biometric data with the biometric data of the authorised user.

In accordance with a second aspect of the invention, there is provided a biometrically activated radio frequency identification (RFID) tag, comprising: input means arranged to acquire biometric data indicative of an identity of a user; and processing means arranged to control an activation or deactivation of the biometrically activated RFID tag selectively, dependent upon the acquired biometric data.

BRIEF DESCRIPTION OF THE DRAWINGS

Embodiments of the present invention will now be described, by way of example only, with reference to the accompanying drawings.

DETAILED DESCRIPTION OF THE INVENTION

Referring now to FIGS. 1, 2, 3 and 4, a biometrically activated RFID tag card (100) comprises a display area (101) and a biometric sensor (102) marked within the display area (101).

Typically, the display area (101) displays user information such as a user's name, position, employee details, and a photograph. Such information enables correct identification of an RFID tag card (100) by a user.

In the present embodiment, the biometric sensor (102) is a fingerprint sensor and will be referred to hereinafter as such. The fingerprint sensor (102) indicates the position a user of the RFID tag card (100) places their finger in order to attempt to activate the RFID tag card (100).

Figure 1:
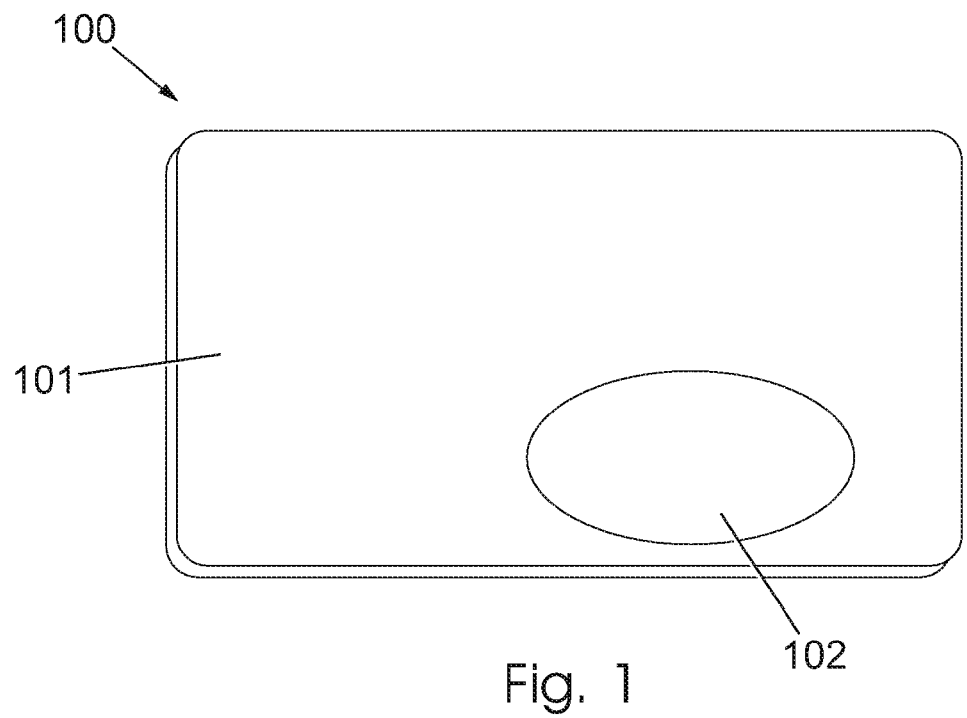
FIG. 1 is a front view of a biometrically activated radio frequency identification (RFID) tag according to an aspect of the first embodiment of the present invention.
Figure 2:
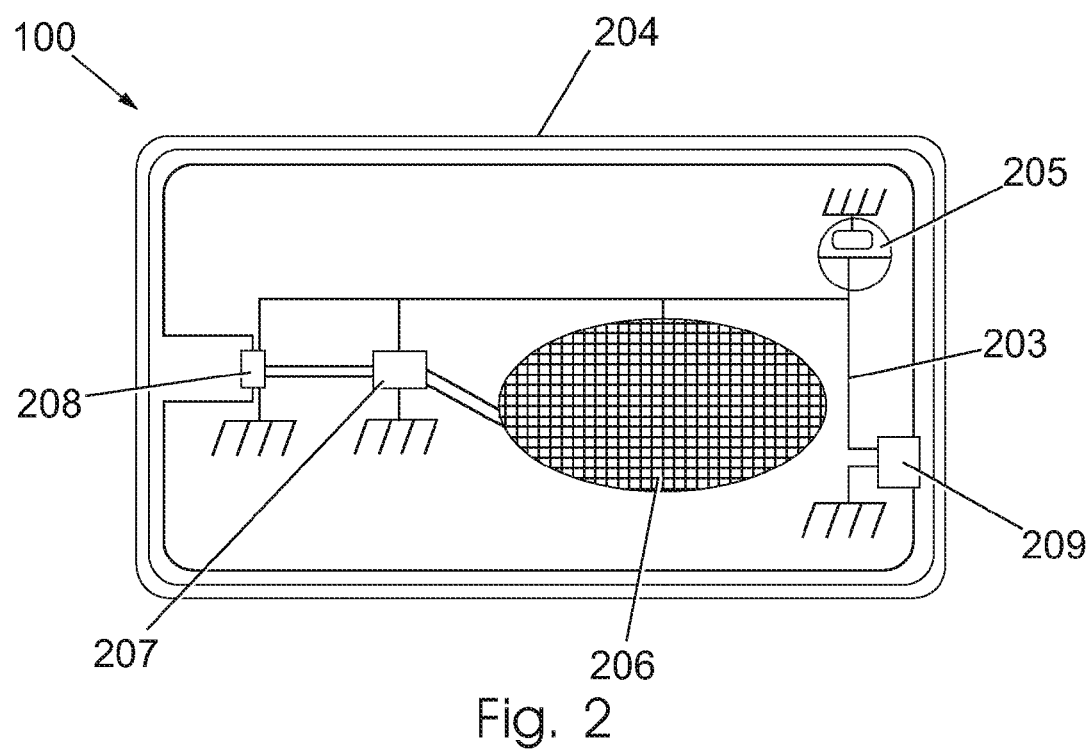
FIG. 2 is a front view of the biometrically activated RFID tag of FIG. 1 showing the internal components.

The biometrically activated RFID tag card (100) comprises a biometrically activated RFID tag (203), as depicted in FIG. 2.

The biometrically activated RFID tag (203) comprises a coil antenna (204), a battery (205), a fingerprint detection matrix (206), a biometric identification chip (207), an antenna control circuit (208) and an RFID chip (209).

Typically, the coil antenna (204), the fingerprint detection matrix (206), the biometric identification chip (207), the antenna control circuit (208) and the RFID chip (209) are powered by the battery (205).

The fingerprint detection matrix (206) is located behind the fingerprint sensor (102). The fingerprint detection matrix (206) is connected to the biometric identification chip (207). The biometric identification chip (207) is in communication with the antenna control circuit (208).

Typically, the biometrically activated RFID tag (203) is a high frequency tag which operates in the 13 MHz radio frequency range. However, the biometrically activated RFID tag can also be implemented using RFID tags which operate in other radio frequency ranges.

In order to initialise the biometrically activated RFID tag card (100) when it is first assigned to a user, the fingerprint of the user is scanned and stored on the card in the biometric identification chip (207).

Typically, this initialisation can be carried out by the authenticated user having their fingerprint scanned by the fingerprint detection matrix (206). Alternatively, the user's fingerprints can be downloaded from a central repository of biometric data that is remote from the RFID tag card (100).

Figure 3:
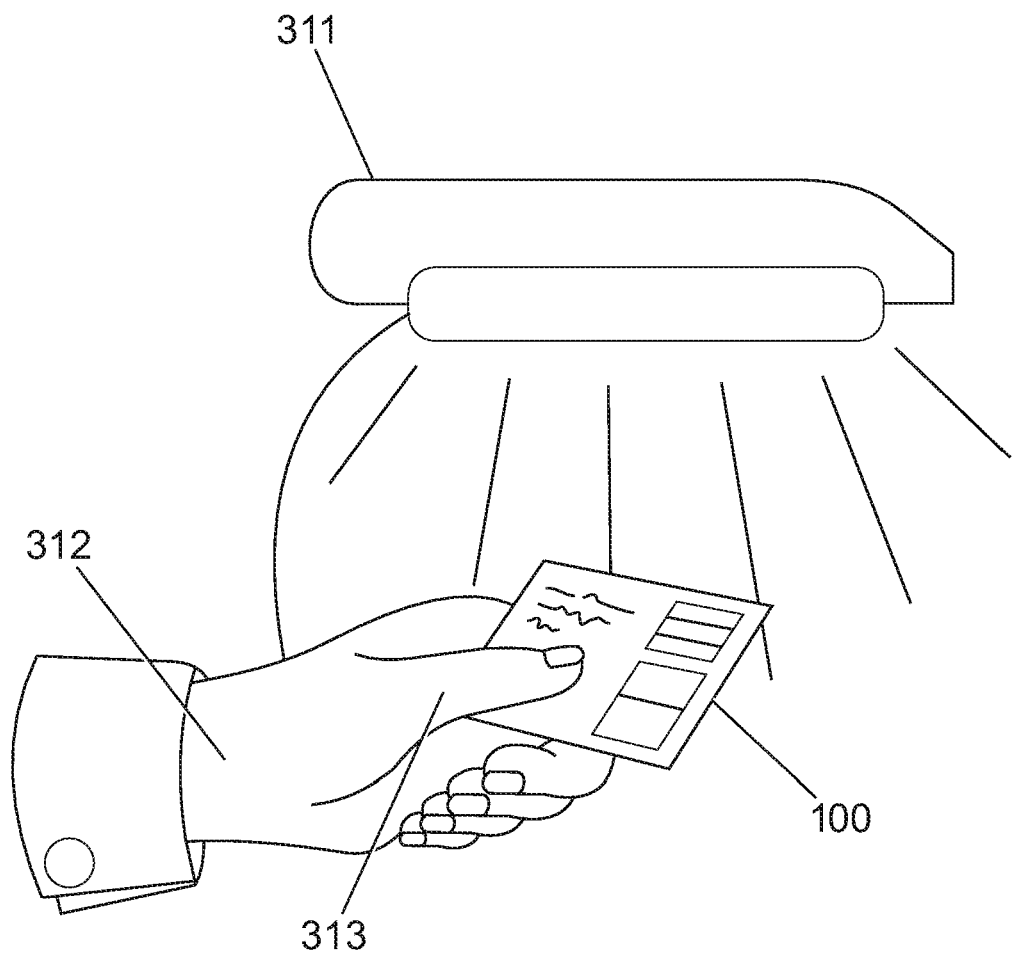
FIG. 3 is a perspective view of the biometrically activated RFID tag being held in a person's hand.
Figure 4:
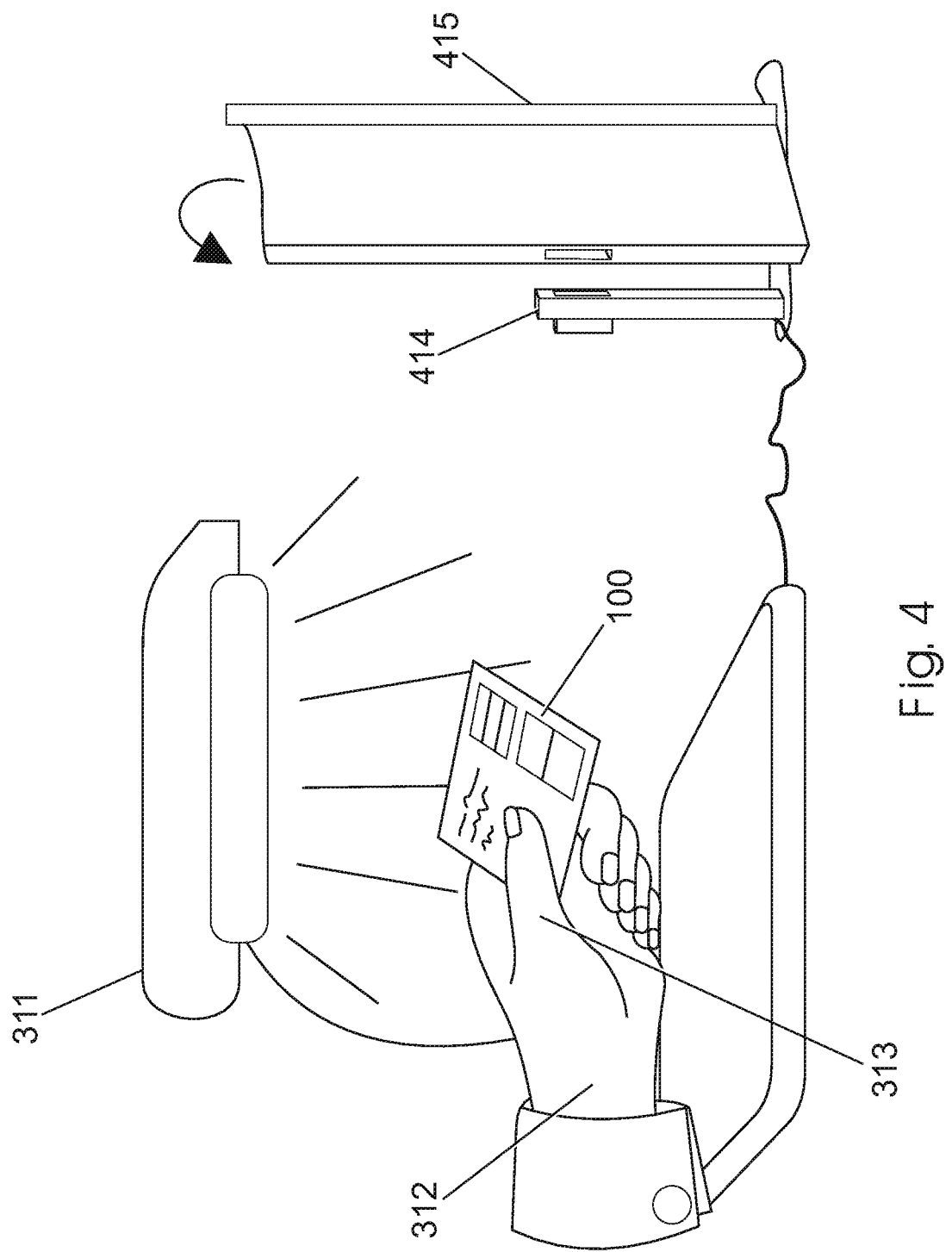
FIG. 4 is a perspective view of the biometrically activated RFID tag being held in a person's hand and controlling access to a door.

As depicted in FIGS. 3 and 4, an interrogator (311) interrogates its surrounding area, typically to the range of 0.5 m. The biometrically activated RFID tag card (100) is positioned in the interrogation area of the interrogator (311). A proposed user holds the RFID tag card (100) in their hand (312) with a finger (313), usually the thumb, placed on the fingerprint sensor (102).

The biometric fingerprint data of a proposed user is input by the placement of their finger (313) on the fingerprint sensor (102). The fingerprint detection matrix (206) acquires the fingerprint of the proposed user. This fingerprint biometric data is passed to the biometric identification chip (207) via a bus. The fingerprint biometric data is compared to stored biometric data of the authorised user(s) on the biometric identification chip (207).

The RFID tag (203) can be activated or deactivated by the antenna control circuit (208) in response to the comparison of stored and sensed fingerprint biometric data by the biometric identification chip (207).

The coil antenna (204) is made of several wire loops. The antenna control circuit (208) is in series with the coil antenna (204) wire and can enable or disable the coil antenna (204). The biometric identification chip (207) sends a signal to the antenna control circuit (208) to disable or enable RFID tag (203).

The antenna control circuit (208) disables the coil antenna (204) by breaking its electrical continuity, and consequently preventing signal propagation via the antenna (204). Conversely, the antenna control circuit (208) enables the RFID tag (203) by making the coil antenna (204) electrically continuous.

The comparison of the biometric data may enable the proposed user to be validated as an authorised user and the RFID tag (203) is activated. Alternatively, the comparison of the biometric data may indicate that the proposed user is not an authorised user and the RFID tag (203) is deactivated.

Typically, the RFID tag (203) is activated only while the authorised user's fingerprint is placed on the fingerprint sensor (102). In order to use the biometrically activated RFID tag card (100) the user places their finger on the fingerprint sensor (102) while the interrogator (311) reads the RFID tag card (100) simultaneously. Typically, the interrogator (311) is continuously active, for example polling every few seconds. Alternatively, the interrogator (311) is activated whenever a presence detection system is coupled to it to detect a tag (203) in the interrogation area of the interrogator (311).

The biometrically activated RFID tag card (100) is activated for a single usage and it remains active as long as the user keeps their finger on the sensor (102) or the RFID tag card (100) can remain active for a predefined period of time. In order to reactivate the RFID tag card (100), the user's fingerprint is re-positioned on the fingerprint sensor (102).

There are many different features of implementations of a biometrically activated RFID system. These can include having a predetermined period of time between successive readings of the fingerprint data. These can also include deactivating the RFID tag card (100) between readings while the finger (313) of the user remains on the fingerprint sensor (102).

The biometrically activated RFID tag (203) can also be used to authorise the display of personal information on a screen. For example, personal information can be displayed on a screen of a public kiosk or on a screen at an airport check in. Personal details such as account information can be displayed on a screen at the bank or medical history can be detailed on a screen at a hospital. The authorised user activates the RFID tag (203) in order to initiate any action or display of information.

The biometrically activated RFID tag card (100) can also be used as identification. The RFID tag (203) can be encoded with a user identity, and optionally their profile. This can be useful for example, if the user is checking in at the main desk at their work place, at a hotel or airport.

The biometrically activated RFID tag (203) uniquely identifies an authenticated user, or group of users. The RFID tag (203) can also hold a variety of other personal information, both biometric and non-biometric. The biometrically activated RFID system enables personal information to be retrieved by the interrogator (311).

Since the biometrically activated RFID tag (203) can only be activated by the authorised user(s), it provides security against usage by unauthorised users.

The interrogator (311) can display profile details and communicate information to the user which is linked on this profile, for example.

FIG. 4 shows the biometrically activated RFID tag card (100) positioned under the interrogator (311). The user places their thumb (313) on the front of the biometrically activated RFID tag card (100) in order to activate the RFID tag card (100). The interrogator (311) is attached to an opening mechanism (414) for opening a door (415).

The biometrically activated RFID tag card (100) can be used to control access to the door (415). The RFID tag (203) is activated by an authorised user's fingerprint. Then the interrogator (311) determines if the user is an authorised user, and permits access to the opening of the door (415) if so. If the user is an authorised user but is not permitted to access the door (415), or if the user is not an authorised user, the door (415) remains locked.

There can be a time limitation on the service delivered or authorisation so that there is a predetermined time period for availing of service or authorisation. For example, the door (415) can remain open for a fixed period, or after a period, the RFID tag card (100) requires reactivation. In certain cases, the door (415) remains open for a predetermined amount of time or until the person enters the next room.

Figure 5:
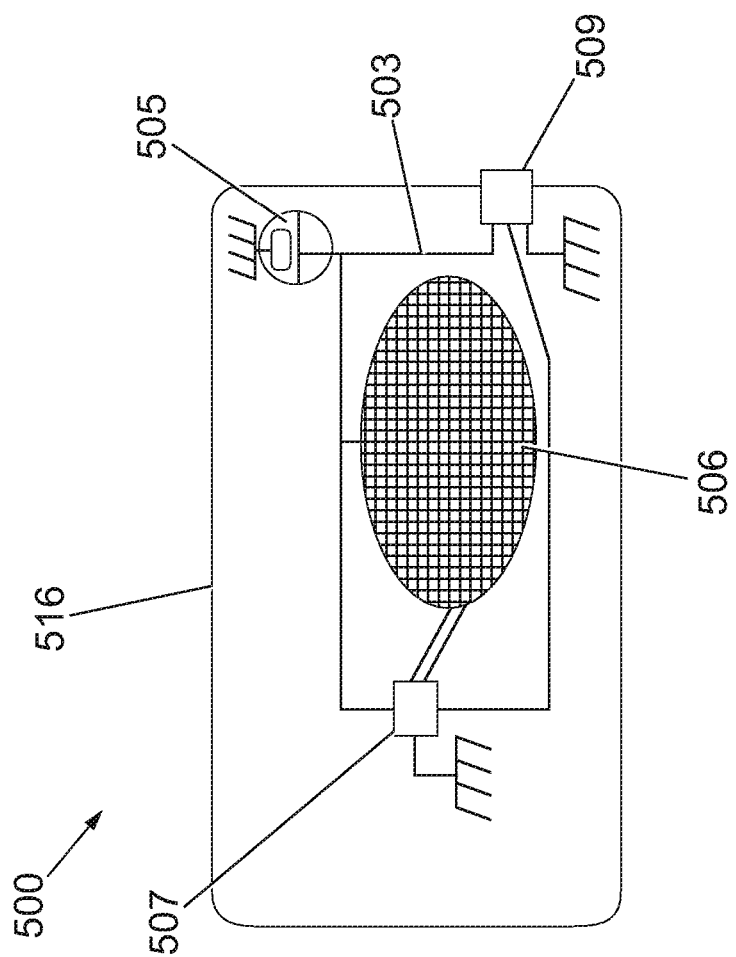
FIG. 5 is a front view of a biometrically activated UHF RFID tag according to an aspect of the second embodiment of the present invention.
Figure 6:
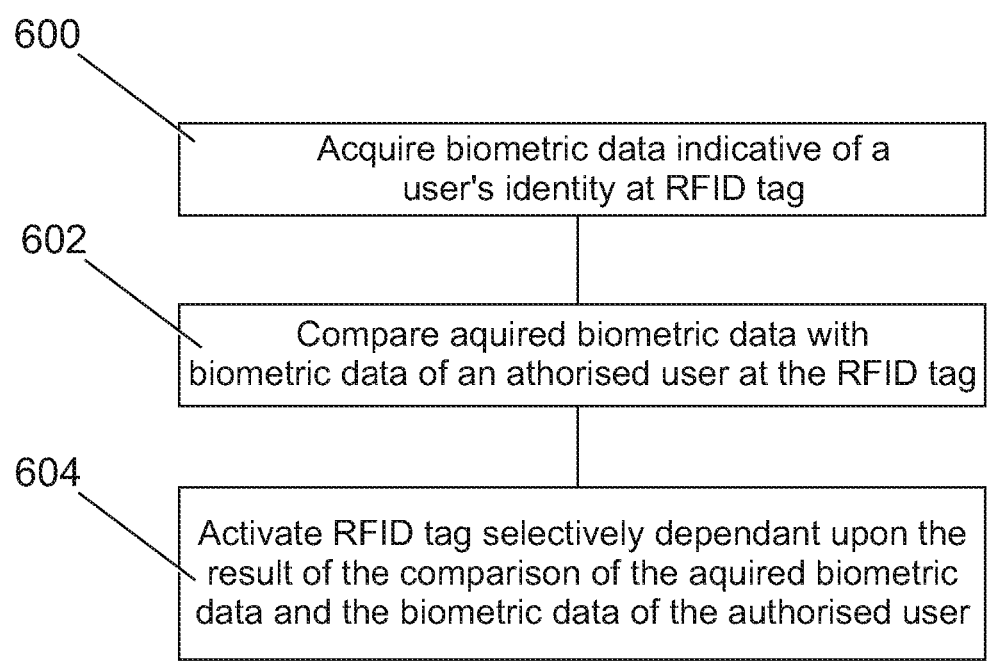
FIG. 6 is a flow chart detailing an embodiment of a method of activating an RFID tag selectively according to an aspect of the present invention.

FIG. 5 shows a biometrically activated UHF RFID tag (500) comprising a dipole antenna (516), a battery (505), a fingerprint detection matrix (506), a biometric identification chip (507) and an RFID chip (509). The UHF tag (500) is similar to the RFID tag (203) except that the coil antenna (204) is replaced by a dipole antenna (516).

It will be appreciated that it is also possible to activate or deactivate the tag (203, 500) by implementing appropriate logic on the RFID chip (209, 509). This implementation would be preferred with the UHF RFID tag (500) which has a dipole antenna (516).

It will also be appreciated that the use of any of a number of biometric sensors are envisaged for use with differing embodiments of the present invention. Examples of possible biometric sensors include a DNA sensor such as a 'lab on a chip', a voice sensor, a retinal scanner, or other suitable biometric sensors. Accordingly the biometric data sensed varies in accordance with the scanner used, for example DNA biometric data, voice biometric data or retinal biometric data.

A method of activating an RFID tag selectively comprises acquiring of biometric data indicative of a user's identity at the RFID tag (Step 600). The acquired biometric data is compared with stored biometric data of an authorised user at the RFID tag (Step 602). The RFID tag is activated selectively, dependent upon the result of the comparison of the acquired biometric data with the biometric data of the authorised user (Step 604).

While the invention has been particularly shown and described with reference to a preferred embodiment, it will be understood that various changes in form and detail may be made therein without departing from the spirit, and scope of the invention.

What is claimed is:

1. A method of activating a radio frequency identification (RFID) tag, comprising:
   acquiring biometric data indicative of an identity of a user at the RFID tag,
   wherein the acquired biometric data comprises fingerprint biometric data, the acquiring including:
      scanning the fingerprint biometric data at the RFID tag, wherein the scanning includes placing a finger of the user over a fingerprint sensor of the RFID tag;
   comparing the acquired biometric data with biometric data of an authorised user at the RFID tag, the biometric data of the authorised user stored at the RFID tag;
   activating the RFID tag in the case that the acquired biometric data matches the biometric data of the authorised user,
   wherein the activating occurs only during simultaneously placing the RFID tag within an operational distance from an interrogator during the placing of the finger of the user over the fingerprint sensor;
   deactivating the RFID tag between successive scans of the finger of the user while the finger of the user remains on the fingerprint sensor of the RFID tag; and
   transmitting information prompting display of the user's personal information on a display external to the RFID tag immediately after activating the RFID tag.

2. The method of claim 1, further comprising:
   selectively enabling an antenna of the RFID tag to selectively activate the RFID tag.

3. The method of claim 1, further comprising:
   providing the biometric data of the authorised user to the RFID tag; and
   storing the biometric data of the authorised user on the RFID tag.

4. The method of claim 3, further comprising:
   providing the biometric data of the authorised user by downloading the biometric data of the authorised user to the RFID tag.

5. A biometrically activated radio frequency identification (RFID) tag, comprising:
   a biometric sensor arranged to acquire biometric data indicative of an identity of a user at the RFID tag,
   wherein the acquired biometric data comprises fingerprint biometric data, the acquiring including:
      scanning the fingerprint biometric data at the RFID tag, wherein the scanning includes placing a finger of the user over a fingerprint sensor of the RFID tag;
   a processing component arranged to:
      control an activation and deactivation of the biometrically activated RFID tag by comparing the acquired biometric data with biometric data of an authorised user stored at the RFID tag;
      activate the RFID tag in the case that the acquired biometric data matches the biometric data of the authorized user,
      wherein the activating occurs only during simultaneously placing the RFID tag within an operational distance from an interrogator during the placing of the finger of the user over the fingerprint sensor; and
      deactivating the RFID tag between successive scans of the finger of the user while the finger of the user remains on the fingerprint sensor of the RFID tag; and
   an antenna arranged to transmit information prompting display of the user's personal information on a display external to the RFID tag immediately after activating the RFID tag.

6. The RFID tag according to claim 5, wherein the biometric sensor is provided on the RFID tag.

7. The RFID tag according to claim 5, further comprising:
   a storage component arranged to store the biometric data of the authorised user on the RFID tag.

8. The RFID tag according to claim 5, wherein the processing component is further arranged to disable or enable the antenna of the RFID tag to selectively activate the RFID tag.

9. The RFID tag according to claim 5, wherein the processing component further comprises:
   an RFID chip arranged to selectively activate or deactivate the RFID tag.

10. A computer program for activating a radio frequency identification (RFID) tag when the computer program is executed on a computer system stored in a computer readable storage medium, the computer program comprising program code for:
    acquiring biometric data indicative of an identity of a user at the RFID tag,
    wherein the acquiring includes:
       scanning the biometric data indicative of the identity of the user at the RFID tag,
       wherein the scanning includes placing a finger of the user over a fingerprint sensor of the RFID tag;
    comparing the acquired biometric data with biometric data of an authorised user at the RFID tag, the biometric data of the authorised user stored at the RFID tag;
    activating the RFID tag in the case that the acquired biometric data matches the biometric data of the authorised user,
    wherein the activating occurs only during simultaneously placing the RFID tag within an operational distance from an interrogator during the placing of the finger of the user over the fingerprint sensor;
    deactivating the RFID tag between successive scans of the finger of the user while the finger of the user remains on the fingerprint sensor of the RFID tag; and
    transmitting information prompting display of the user's personal information on a display external to the RFID tag immediately after activating the RFID tag.

* * * * *